(12) United States Patent
Todd et al.

(10) Patent No.: US 9,264,441 B2
(45) Date of Patent: Feb. 16, 2016

(54) SYSTEM AND METHOD FOR SECURING A NETWORK FROM ZERO-DAY VULNERABILITY EXPLOITS

(75) Inventors: Michael Todd, Rocklin, CA (US); Scott Robert Koster, Roseville, CA (US); Patrick Choy Ming Wong, Sacramento, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1645 days.

(21) Appl. No.: 12/079,013

(22) Filed: Mar. 24, 2008

(65) Prior Publication Data

US 2009/0241190 A1 Sep. 24, 2009

(51) Int. Cl.
| | |
|---|---|
| G06F 7/04 | (2006.01) |
| H04L 29/06 | (2006.01) |
| G06F 21/53 | (2013.01) |
| G06F 21/55 | (2013.01) |
| G06F 21/56 | (2013.01) |
| G06F 21/57 | (2013.01) |

(52) U.S. Cl.
CPC ............ *H04L 63/1416* (2013.01); *G06F 21/53* (2013.01); *G06F 21/552* (2013.01); *G06F 21/564* (2013.01); *G06F 21/566* (2013.01); *G06F 21/577* (2013.01); *H04L 63/1441* (2013.01); *G06F 2221/2101* (2013.01)

(58) Field of Classification Search
CPC .............................. G06F 21/552; G06F 21/53
USPC ................................ 726/22, 23, 24, 1, 25, 26
See application file for complete search history.

(56) References Cited

U.S. PATENT DOCUMENTS

| | | | |
|---|---|---|---|
| 5,948,104 A * | 9/1999 | Gluck et al. ................ 726/24 |
| 7,058,821 B1 | 6/2006 | Parekh et al. |
| 7,134,141 B2 | 11/2006 | Crosbie et al. |
| 7,159,237 B2 | 1/2007 | Schneier et al. |
| 7,174,566 B2 | 2/2007 | Yadav |
| 7,225,468 B2 | 5/2007 | Waisman et al. |
| 7,228,564 B2 | 6/2007 | Raikar et al. |
| 7,240,368 B1 | 7/2007 | Roesch et al. |
| 7,243,371 B1 | 7/2007 | Kasper et al. |

(Continued)

FOREIGN PATENT DOCUMENTS

| | | | |
|---|---|---|---|
| WO | WO-02/06928 | * | 1/2002 |
| WO | WO-2006/107712 A2 | | 10/2006 |
| WO | WO-2008/130923 A1 | | 10/2008 |

OTHER PUBLICATIONS

"Honeypot (computing)," Wikipedia, accessed Jan. 22, 2008 at http://en.wikipedia.org/wiki/Honeypot_%28computing%29.

(Continued)

*Primary Examiner* — Abu Sholeman
(74) *Attorney, Agent, or Firm* — Greer, Burns & Crain, Ltd.

(57) ABSTRACT

A method of securing a network from vulnerability exploits, including the steps of a traffic analysis engine receiving a plurality of packets destined for an internal operating system; the traffic analysis engine selectively forwarding the packets to at least one virtual machine emulating the internal operating system; the virtual machine processing each forwarded packet; a rapid analysis engine identifying a malicious packet from the processed packets; and the rapid analysis engine creating a new signature to identify the malicious packet.

15 Claims, 2 Drawing Sheets

(56) References Cited

U.S. PATENT DOCUMENTS

| | | | |
|---|---|---|---|
| 7,320,142 B1 | 1/2008 | Kasper et al. | |
| 7,327,690 B2 | 2/2008 | Billhartz | |
| 7,840,996 B1* | 11/2010 | Wu | 726/15 |
| 8,020,206 B2* | 9/2011 | Hubbard et al. | 726/22 |
| 8,141,159 B2* | 3/2012 | Peled et al. | 726/26 |
| 8,391,288 B2* | 3/2013 | Todd | 370/392 |
| 8,490,152 B2* | 7/2013 | Staiman et al. | 726/1 |
| 8,595,480 B2* | 11/2013 | Dimitrakos et al. | 713/153 |
| 2005/0175001 A1* | 8/2005 | Becker Hof et al. | 370/389 |
| 2005/0188272 A1* | 8/2005 | Bodorin et al. | 714/38 |
| 2005/0262562 A1* | 11/2005 | Gassoway | 726/22 |
| 2006/0075052 A1* | 4/2006 | Oostendorp | 709/206 |
| 2006/0112416 A1* | 5/2006 | Ohta et al. | 726/1 |
| 2006/0242701 A1* | 10/2006 | Black et al. | 726/22 |
| 2007/0079307 A1* | 4/2007 | Dhawan et al. | 718/1 |
| 2007/0174915 A1* | 7/2007 | Gribble et al. | 726/24 |
| 2007/0250930 A1* | 10/2007 | Aziz et al. | 726/24 |
| 2008/0010683 A1* | 1/2008 | Baddour et al. | 726/24 |
| 2008/0016570 A1 | 1/2008 | Capalik | |
| 2008/0098476 A1* | 4/2008 | Syversen | 726/23 |
| 2008/0101223 A1* | 5/2008 | de los Reyes | 370/230 |
| 2008/0181227 A1* | 7/2008 | Todd | 370/392 |
| 2008/0219162 A1* | 9/2008 | Akyol | 370/232 |
| 2008/0229419 A1* | 9/2008 | Holostov et al. | 726/24 |
| 2009/0003317 A1* | 1/2009 | Kasralikar et al. | 370/352 |
| 2009/0125755 A1* | 5/2009 | Herscovitz et al. | 714/15 |
| 2009/0147793 A1* | 6/2009 | Hayakawa et al. | 370/401 |
| 2009/0158140 A1* | 6/2009 | Bauchot et al. | 715/234 |
| 2010/0031353 A1* | 2/2010 | Thomas et al. | 726/22 |
| 2010/0218254 A1* | 8/2010 | Gray et al. | 726/23 |
| 2012/0174218 A1* | 7/2012 | McCoy et al. | 726/22 |
| 2012/0260250 A1* | 10/2012 | Maeda et al. | 718/1 |
| 2012/0304244 A1* | 11/2012 | Xie et al. | 726/1 |
| 2013/0014259 A1* | 1/2013 | Gribble et al. | 726/24 |

OTHER PUBLICATIONS

Alen Capalik, "Next-Generation Honeynet Technology with Real-Time Forensics for U.S. Defense," MILCOM 2007, Date: Oct. 29, 2007, pp. 1-7, Piscataway, NJ, USA, IEEE.

Office Action, EP Application No. 09004917.2, Date: May 6, 2011, pp. 1-6.

Office Action, EP Application No. 09004917.2, Date: May 12, 2014, pp. 1-7.

* cited by examiner

SYSTEM AND METHOD FOR SECURING A NETWORK FROM ZERO-DAY VULNERABILITY EXPLOITS

BACKGROUND OF THE INVENTION

The present invention relates generally to the useful art of computer software programming and more specifically to software relating to computer networks.

Intrusion Prevention Systems (IPS) are used to protect computer networks against malicious incoming traffic. However, the effectiveness of an IPS is limited due to the fact that an IPS only blocks traffic for which it has a "signature." A signature is a specific rule used by a content filtering system to detect electronic threats. Accordingly, an IPS may not block an exploit for a vulnerability the vendor is not aware of, or for which there is no patch available. A zero-day exploit is one that takes advantage of a security vulnerability before the vulnerability becomes generally known, or before a signature has been developed, thus leaving the exploit in circulation.

Zero-day protection is the ability to provide protection against zero-day exploits. Because zero-day attacks are generally unknown to the public, it is often difficult to defend against them. Zero-day attacks are often effective against networks considered "secure" and can remain undetected even after they are launched.

Several techniques exist to limit the effectiveness of zero-day memory corruption-type vulnerabilities, such as buffer overflows. These protection mechanisms exist in contemporary operating systems such as SUN MICROSYSTEMS SOLARIS, LINUX, UNIX, and UNIX-like environments. Versions of MICROSOFT WINDOWS XP Service Pack 2 and later include limited protection against generic memory corruption-type vulnerabilities. Desktop and server protection software also exists to mitigate zero-day buffer overflow vulnerabilities. Typically, these technologies involve heuristic determination analysis, stopping the attacks before they cause any harm. However, this type of analysis is prone to a high incidence of false positive results.

Another approach to limiting effectiveness of zero-day exploits is the use of a honeypot. A honeypot is a trap set to detect, deflect, or in some manner counteract attempts at unauthorized use of network or information systems. Honeypots are generally designed to give an administrator the ability to track malicious activity for investigation purposes. However, honeypots have a major disadvantage in that they require heavy user interaction and administration. The investigation consists of manually capturing a packet entering the honeypot and either making a custom signature within an IPS, or waiting for the IPS vendor to create one.

The standard IPS approaches have the significant flaw of missing signatures for zero-day attacks. Second generation IPS devices attempted to fill this void by performing heuristic behavior analysis on the inspected traffic. While this analysis assists in building an improved signature-based system, such approaches are under heavy scrutiny due to the number of false positives generated and the general lack of reliability in catching zero-day attacks.

DETAILED DESCRIPTION

The first embodiment of the present invention is a method for securing a network from zero-day vulnerability exploits by sending packets destined for an internal operating system to a virtual machine emulating the operating system or environment wherein the packets are monitored for errors. Malicious packets can be identified upon the virtual machine's failure, resulting in the creation of a signature for identifying the malicious packet. The use of virtual machines and monitoring techniques allow for the creation of a security system that can automatically respond to malicious traffic by dynamically creating signatures, thus minimizing the need for user interaction. In addition, the number of false positive threats is minimized as signatures are only created upon the virtual machine's failure.

Figure 1:
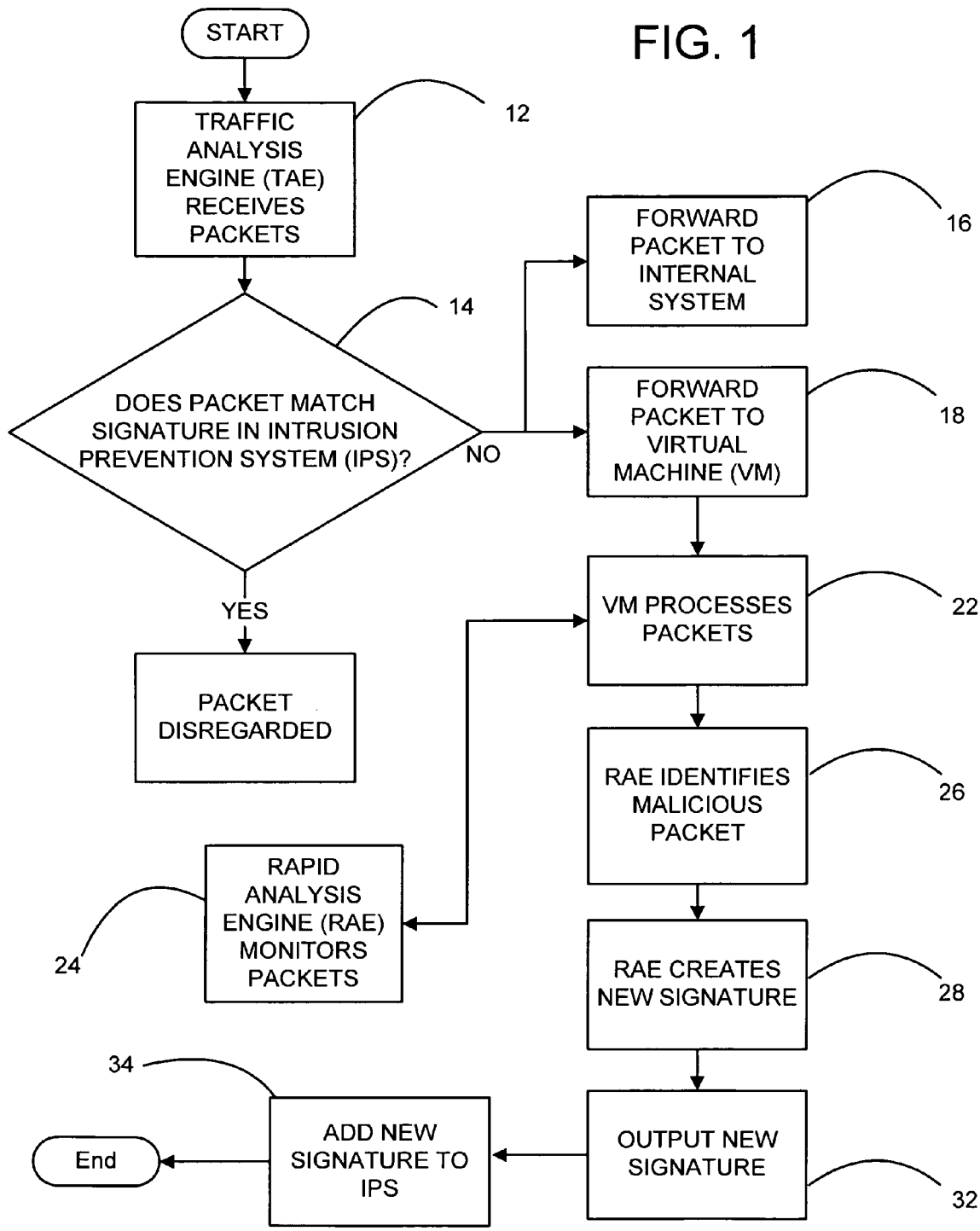
FIG. 1 is a flowchart illustrating the operating steps of a first embodiment of a method of the present invention.

Turning now to FIG. 1, in the first embodiment, a method of securing a network from vulnerability exploits is described. Initially, a traffic analysis engine receives a plurality of packets destined for an internal operating system, the packets being received through an incoming network card (step 12). An initial check is performed with each packet being compared to at least one signature defined in an intrusion prevention system (IPS) (step 14). If any packet being compared does not match any of the signatures in the IPS, the traffic analysis engine forwards each packet to the internal operating system through an outgoing network card, as the packet is not currently considered malicious (step 16). Similarly, the traffic analysis engine selectively forwards packets to at least one virtual machine emulating the internal operating system, based on whether the packet matches any of the signatures kept in the IPS (step 18).

The virtual machine is preferably created by an administrator through the use of a graphical user interface and is customizable. Thus, for example, the virtual machine can be designed to mimic a particular operating system running in its environment. When the virtual machine is created, an access control list is also created within the traffic analysis engine specifying packets that the virtual machine is not configured to process, thus allowing the traffic analysis engine to filter the packets it forwards to the virtual machine.

Upon receiving the forwarded packets, the virtual machine processes the packets (step 22). As the packets are being processed, a rapid analysis engine monitors performance of the virtual machine to detect a failure occurring during the emulation (e.g., application freezes, unintentional starting or stopping of services) (step 24). Such monitoring is accomplished by having the virtual machine send a status report to the rapid analysis engine over a private network connection linking the virtual machine and the rapid analysis engine. This allows the rapid analysis engine, which contains a monitoring and reporting tool, to monitor and report health information relating to the virtual machine (e.g., process tables, sockets of running applications, processor utilization, and memory utilization.)

The monitoring of the virtual machine allows the rapid analysis engine to identify a malicious packet from the packets being processed (step 26). To identify the malicious packet, the packets that are forwarded to the virtual machine are stored in a buffer for a period of time, the buffer providing storage for a plurality of packets. Then, when a failure is detected in the virtual machine, the packets in the buffer are analyzed as the buffer only contains packets that were recently sent to the virtual machine. To allow for flexibility in selecting how many packets are considered when identifying the malicious packet, a predetermined time period (i.e., an upper-bound time limit) is established. Then, if any packet remains in the buffer for less than the time period, that packet is deleted. Thus, the buffer contains only "recently" processed packets, where "recently" is defined as packets forwarded to the virtual machine within the time period. As a result, when the virtual machine fails, all buffered traffic within a window of time is flagged as suspect traffic is run through the traffic analysis engine.

Further filtering of the buffer is accomplished by identifying and deleting non-malicious packets from the buffer. Such steps further increase the method's efficiency by reducing the number of packets that need to be considered when identifying the malicious packet. When all non-malicious packets are removed, the rapid analysis engine analyzes the packets in the buffer and identifies the malicious packet.

Once the malicious packet is identified, the rapid analysis engine creates a new signature for identifying the maliciously packet (step 28). The new signature is then sent to an output device for notification to an administrator and added to the IPS (steps 32 and 34). Thus, if a similar malicious packet enters the traffic analysis engine thereafter, it will not be forwarded to the internal operating system as a signature matching the malicious packet will have been added to the now modified IPS and the packet would be discarded. The signatures in the IPS are also periodically sent to the internal operating system through the outgoing network card, allowing the internal operating system to update its own IPS.

To monitor the efficiency and overall functionality of the method described in the first embodiment, the execution of each step performed is logged and stored in a memory.

In a second embodiment, a computer program product for securing a network from vulnerability exploits is described. The computer program product includes a computer-readable medium having codes for causing a traffic analysis engine to receive a plurality of packets destined for an internal operating system; codes for causing the traffic analysis to selectively forward the packets to at least one virtual machine emulating the internal operating system; codes for causing the virtual machine to process each packet; codes for causing the rapid analysis engine to identify a malicious packet from the packets being processed; codes for causing the rapid analysis engine to create a new signature to identify the malicious packet; codes for causing the new signature to be added to the intrusion prevention system; and a codes for causing the new signature to be displayed to an output device.

Figure 2:
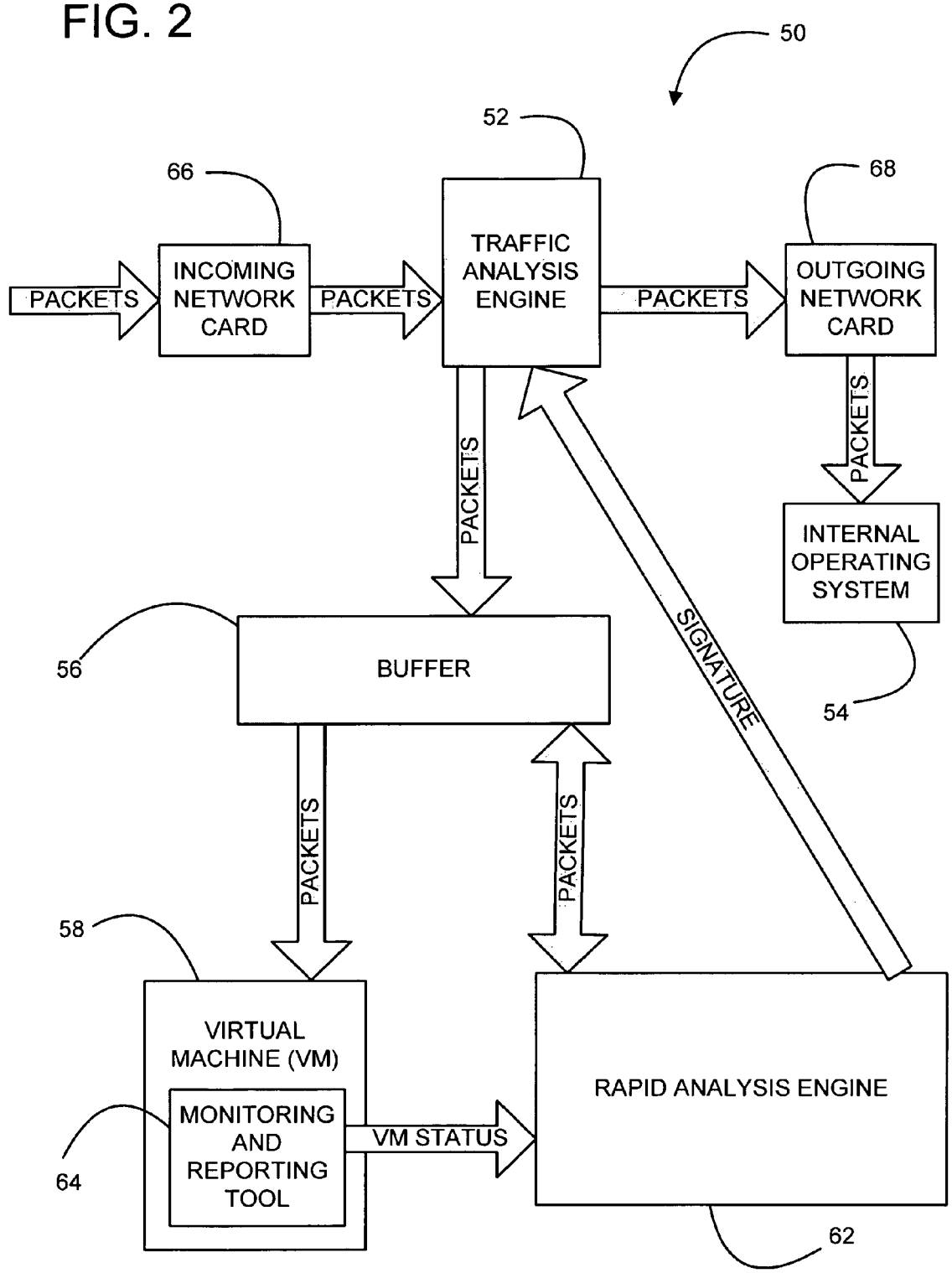
FIG. 2 is a system showing a second embodiment of a system of the present invention.

Turning now to FIG. 2, in a third embodiment, a system, generally designated 50, for securing a network from vulnerability exploits is described. Included in the system 50 is a traffic analysis engine 52 which receives a plurality of packets and selectively forwards the packets to an internal operating system 54 and to a buffer 56. The buffer 56 is in communication with a virtual machine 58 that emulates the internal operating system 54, and a rapid analysis engine 62. The rapid analysis engine 62 monitors the virtual machine 58 by receiving data from a monitoring and reporting tool 64 in the virtual machine 58. Upon the virtual machine's 58 failure, the rapid analysis engine 62 identifies a malicious packet being processed on the virtual machine 58 by searching flagged packets in the buffer 56 and creates a signature based on the malicious packet.

To facilitate communication, the system preferably includes an incoming network card 66 providing communication between the system 50 and an external source and further includes an outgoing network card 68 providing communication between the system 50 and the internal operating system 54.

While several particular embodiments of a system and method for securing a network from zero-day vulnerability exploits have been described herein, it will be appreciated by those skilled in the art that changes and modifications may be made thereto without departing from the invention in its broader aspects and as set forth in the following claims.

What is claimed is:

1. A method of securing a network from vulnerability exploits, comprising:
   receiving a plurality of packets destined for an internal operating system;
   comparing, by a processor, packets received to at least one signature defined in an intrusion prevention system;
   upon a determination that a packet being compared does not match any signature in said intrusion prevention system, storing the packet in a buffer, the buffer providing storage for a plurality of packets;
   forwarding a copy of the packet to a virtual machine emulating said internal operating system in processing the packet;
   monitoring performance of the virtual machine;
   deleting the stored packet from the buffer upon a determination that the stored packet was stored in the buffer for a predetermined time period;
   detecting a failure of the virtual machine;
   analyzing the packets in the buffer to identify a malicious packet in response to detecting the failure of the virtual machine; and
   creating a new signature based upon the identified malicious packet.

2. The method of claim 1 further comprising:
   adding said new signature to said intrusion prevention system.

3. The method of claim 1 further comprising:
   recording execution of at least one of said receiving, said comparing, said forwarding, said processing, said identifying, and said creating in a memory.

4. A method of securing a network from vulnerability exploits, comprising:
   receiving a plurality of packets destined for an internal operating system;
   storing each packet of the plurality of packets in a buffer;
   selectively forwarding a copy of each packet of said plurality of packets to a virtual machine emulating said internal operating system;
   monitoring performance of said virtual machine in processing the forwarded packets;
   deleting a stored packet of the plurality of packets from the buffer upon a determination that said packet was stored in the buffer for a predetermined time period;
   detecting a failure of said virtual machine;
   analyzing said packets in said buffer and identifying a malicious packet from said buffer packets in response to detecting the failure of said virtual machine; and
   creating a malicious packet signature based upon the identified malicious packet.

5. The method of claim 4 further comprising:
   sending, by said virtual machine, a status report to said processor through a private network connection linking said virtual machine to said processor.

6. The method of claim 4 further comprising:
   identifying at least one non-malicious packet; and
   deleting each said non-malicious packet from said buffer.

7. The method of claim 4 further comprising:
   recording execution of at least one of said defining, said storing, said deleting, said monitoring, and said analyzing in a memory.

8. The method of claim 1 further comprising:
   upon a determination that said packet being compared does match any said signature, preventing said packet from being sent to said internal operating system.

9. The method of claim 1 further comprising:
sending at least one of said signatures in said intrusion prevention system to said internal operating system.

10. The method of claim 1 further comprising:
creating an access control list within said traffic analysis engine specifying packets not to be processed using said virtual machine.

11. A non-transitory machine-readable medium comprising machine readable instructions that when executed by a processor perform a method, the machine readable instructions to cause the processor to:
receive a plurality of packets destined for an internal operating system;
store the plurality of packets in a buffer;
forward a copy of each packet of said plurality of packets to a virtual machine emulating said internal operating system;
monitor performance of said virtual machine in processing the forwarded packets;
delete a packet of the plurality of packets from the buffer upon a determination that said packet was stored in the buffer for a predetermined time period;
detect a failure of said virtual machine; and
analyze said packets in said buffer and identify said malicious packet from said buffer packets in response to detecting the failure of said virtual machine; and
create a malicious packet signature based upon the identified malicious packet.

12. The non-transitory machine readable medium of claim 11, wherein the machine readable instructions further comprise code to:
add said identified malicious packet signature to an intrusion prevention system.

13. A system for securing a network from vulnerability exploits, comprising:
a traffic analysis engine, the traffic analysis engine further comprising a processor and a non-transitory computer-readable medium, the non-transitory computer readable medium comprising code, which when executed by the processor, cause the traffic analysis engine to:
receive a plurality of packets destined for an internal operating system;
store each packet of the plurality of packets in a buffer;
selectively forward a copy of each said packet to a virtual machine emulating said internal operating system;
monitor performance of said virtual machine in processing the selectively forwarded packets;
delete a packet of the plurality of packets from the buffer upon a determination that said packet was stored in the buffer for a predetermined time period;
detect a failure of said virtual machine; and
analyze said packets in said buffer and identify said malicious packet from said buffer packets in response to detecting the failure of said virtual machine; and
create a malicious packet signature based upon the identified malicious packet.

14. The system of claim 13 further comprising:
an incoming network card to provide communication between said system and an external source; and
an outgoing network card to provide communication between said system and said internal operating system.

15. A method of securing a network from vulnerability exploits, comprising:
analyzing packets destined for an internal operating system and discarding any packets having a signature indicating a vulnerability exploit;
storing each packet of the packets in a buffer;
selectively forwarding a copy of each of the packets that do not have a signature indicating a vulnerability exploit to a virtual machine emulating said internal operating system;
monitoring performance of the virtual machine in processing the selectively forwarded packets;
deleting a stored packet from the buffer upon a determination that the stored packet was stored in the buffer for a predetermined time period;
detecting a failure of the virtual machine; and
analyzing the packets in the buffer and identifying a malicious packet from said buffer packets in response to a detected failure of the virtual machine; and
creating a new signature based on the identified malicious packet.

* * * * *